United States Patent [19]

Inagaki

[11] Patent Number: 4,729,410

[45] Date of Patent: Mar. 8, 1988

[54] CASING FOR SAUSAGES

[76] Inventor: Hiromichi Inagaki, 1-143, Aza Maedaomote, Inuyama-shi, Aichi-ken, Japan

[21] Appl. No.: 837,091

[22] Filed: Mar. 5, 1986

[30] Foreign Application Priority Data

Mar. 6, 1985 [JP] Japan .............................. 60-32055[U]

[51] Int. Cl.⁴ ........................ F16L 11/00; A22C 13/00
[52] U.S. Cl. ................................ 138/118.1; 138/145; 138/146; 428/36; 426/105; 426/135; 426/420
[58] Field of Search ...................... 138/118.1, 145, 146; 17/42, 49; 428/36; 426/105, 135, 138, 420

[56] References Cited

U.S. PATENT DOCUMENTS

| | | | |
|---|---|---|---|
| 4,287,217 | 9/1981 | Hammer et al. | 138/118.1 |
| 4,391,302 | 7/1983 | Huhn et al. | 138/118.1 |
| 4,399,839 | 8/1983 | Hutschenreuter et al. | 138/118.1 |
| 4,401,136 | 8/1983 | Porrmann et al. | 138/118.1 |
| 4,410,011 | 10/1983 | Andrä et al. | 138/118.1 |
| 4,623,566 | 11/1986 | Kastl et al. | 138/118.1 |

FOREIGN PATENT DOCUMENTS 2657833   6/1978   Fed. Rep. of Germany ... 138/118.1

Primary Examiner—James E. Bryant, III
Attorney, Agent, or Firm—McGlew and Tuttle

[57] ABSTRACT

A casing in use for sausages that utilizes the heat shrinkable plastic film, and features the formation of vinylidene layer on the internal surface of heat shrinkable plastic film, namely on the area getting in direct contact with the sausages.

2 Claims, 2 Drawing Figures

CASING FOR SAUSAGES

FIELD OF THE INVENTION

This invention is concerned with the casing making use of the heat shrinkable plastic film for directly filling and sealing a sausage paste.

DESCRIPTION OF THE PRIOR ART

Animal intestines were used in the past for filling the sausages but nowadays a "Ryphane" (hydrochloride rubber) or the heat shrinkable plastic is used, for instance, the heat shrinkable plastic film is utilized instead of the animal intestines because it is difficult to obtain the animal intestines at a quantity meeting the consumption requirements and because they are inappropriate for mass production using machines.

"Ryphane" has the nature of shrinking and restoring to its original size, when heated, the casing expands as the content swells one end of casing formed to a cylindrical shape and tightened with a string for filling the sausage paste thereinto and also is tightened up at the other edge, and then heated up. "Ryphane" also provides the feature of not generating any wrinkles on the product, but "Ryphane" also has the nature of not allowing water to permeate though it, and offers such features that the seasoning liquid will not flow out of the casing when boiled, and that no bacteria will invade the package, thus protecting the sausage from deteriorating.

Further, the heat shrinkable plastic film casing has excellent transparency, and hence, this heat shrinkable plastic film is widely utilized in recent years.

The typical heat shrinkable plastic film is represented by the heat shrinkable nylon film, but this heat shrinkable nylon film does not have a heat sealing property by itself, and therefore it is difficult to round up the film for overlapping both the ends or pasting them together with a tape into a cylindrical shape. In the past, therefore, the internal face of heat shrinkable nylon was pasted with a plastic film having heat sealing property, for instance, with polyethylene film.

However, this polyethylene film has an inferior adhesion with the content, and entails such a defect that, when the product after boiling is looked at, the surface of the contents peels off sporadically against the casing, and the peeled areas tend to collect drips, thus causing the content to become discoloured and its appearance aggravated. The quality of sausage also deteriorates resulting in poorer taste.

SUMMARY OF THE INVENTION

This invention aims at providing the casing being used for sausages, where the contents will not separate from the casing, or in other words, that the cohesion between content and casing has been improved.

DETAILED DESCRIPTION OF PREFERRED EMBODIMENTS

This invention provides a casing for sausages in which a vinylidene layer is built up on the internal face of a heat shrinkable plastic film for imporved cohesion with the contents, and two typical embodiments introduced below.

Figure 1:
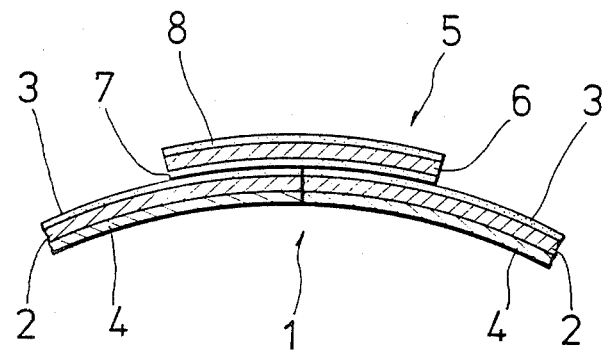
FIG. 1 is a sectional view a portion of a casing with ends butted to each other and jointed together with a joining tape pasted on the external side of the heat shrinkable nylon film whose internal face is lined with a vinylidene layer.

In FIG. 1, the code number 1 stands for the sausage casing that has been formed to a cylindrical shape, the code 2 the main heat shrinkable nylon film that builds up the said casing 1, the code 3 the polyethylene layer that has been formed on external face of heat shrinkable nylon film 2, and the code 4 the vinylidene layer (or the layer mainly consisting of vinylidene) formed on the internal face of the heat shrinkable nylon film. What's more, this vinylidene layer 4 can either be formed by pasting up the vinylidene film or by applying the vinylidene coating.

Code 5 represents the joining tape made of heat shrinkable nylon film that builds up the polyethylene layer 7 on its external face, and is heat sealed, onto the external side of the heat shrinkable nylon film 2 that has been rounded over the casing 1 whose edges are butted to each other.

The sausage becomes the product after it has been filled and sealed into the casing 1 that has been formed to the aforesaid cylindrical shape, and then boiled.

Figure 2:
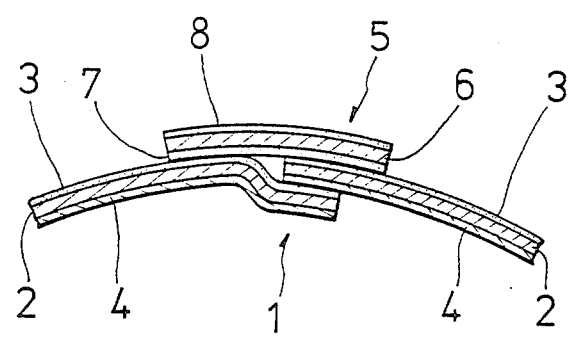
FIG. 2 is the sectional view showing a part of casing where both the edges of heat shrinkable nylon film with vinylidene layer formed on its internal face are not only overlapped with each other but also both the edges are joined together by pasting.

FIG. 2 shows another embodiment of casing 1 in which the vinylidene layer 4 forms the internal face Both of the edges of a heat shrinkable nylon film 2 are overlapped so that they form, with the polyethylene layer 3, an external face which is joined by the joining tape 5 on this external side.

As mentioned above, this invention features the formation of a vinylidene layer 4 on the internal face of heat shrinkable plastic film, for instance, heat shrinkable nylon film. This vinylidene provides a better adhesion with the contained materials, especially with fish meat and animal meat, and thus no peeling-off phenomenon is found against the contents even if the casing is swollen or shrunk through a heating or cooling process.

As a result, no drips will be accumulated at the peeled off areas as found with conventional casings, and the appearance and quality of product can be maintained to the best condition.

I claim:

1. A tubular food casing for food products such as sausage, comprising a continuous multi-layer film including a heat-sealing layer on its exterior, said film being shaped into a tubular form with adjacent ends overlapping each other, a sealing tape overlapping said film exterior and extending over and beyond the adjacent tape overlapping said film exterior and extending over and beyond the adjacent overlapping ends and closing said tubular form, and a vinylidene material layer covering the interior of said film, said film having an interior layer of nylon film between said exterior heat-sealing layer and said interior vinylidene material layer.

2. A tubular food casing according to claim 1 wherein said sealing tape has an inner layer of polyethylene, said heat-sealable layer on said exterior of said film comprising a layer of polyethylene for sealing to said tape.

* * * * *